I. J. CARPENTER.
WHEEL RIM.
APPLICATION FILED APR. 4, 1911.
1,020,478.
Patented Mar. 19, 1912.
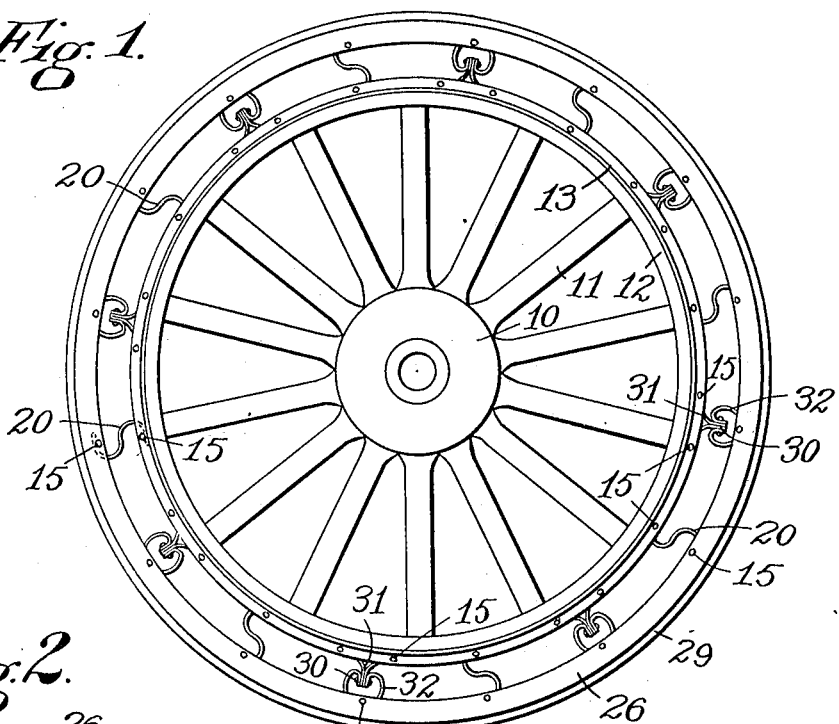
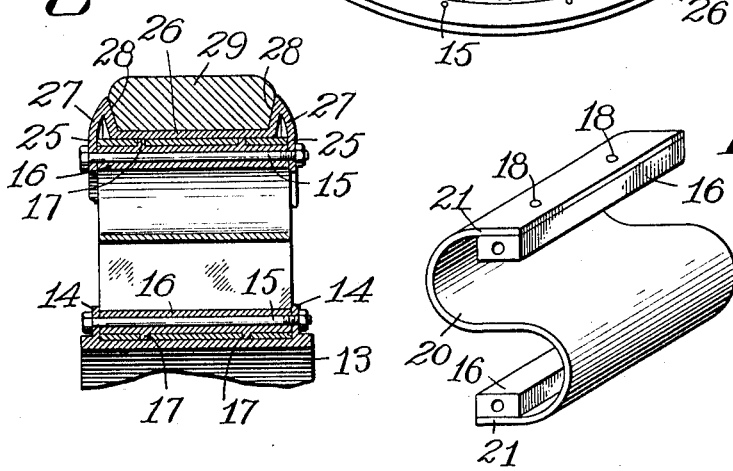
Witnesses.
C. F. Wesson
E. M. Allen
Inventor
Israel J. Carpenter.
By Attorneys.
Southgate & Southgate.

UNITED STATES PATENT OFFICE.

ISRAEL J. CARPENTER, OF MARLBORO, MASSACHUSETTS.

WHEEL-RIM.

1,020,478.

Specification of Letters Patent.   Patented Mar. 19, 1912.

Application filed April 4, 1911.   Serial No. 618,886.

*To all whom it may concern:*

Be it known that I, ISRAEL J. CARPENTER, a citizen of the United States, residing at Marlboro, in the county of Middlesex and State of Massachusetts, have invented a new and useful Wheel-Rim, of which the following is a specification.

This invention relates to a resilient wheel rim capable of use as a removable rim to be attached to, or shrunk on, a felly or as a fixed part of the wheel.

The principal objects of the invention are to provide means whereby an outside rim or tire can be resiliently connected with an inside rim or felly so constructed that the resilient connections themselves will laterally support each of the connected parts from the other so that they will need no other means to prevent lateral motion; to provide a construction of this character in which the axle is not only supported from the bottom by resting on the springs but is resilently supported in part from the top; and to provide a construction for these purposes of an exceedingly simple and inexpensive character both to manufacture and maintain.

Further objects and advantages of the invention will appear hereinafter.

Reference is to be had to the accompanying drawings, in which—

Figure 1 is a side view of a wheel with one form of this invention applied thereto; Fig. 2 is a transverse radial sectional view through the attachment showing the same on enlarged scale; Fig. 3 is a perspective view of one of the springs; and Fig. 4 is a side view of one of the attaching pieces therefor.

So far as I am aware the attempts which have been made to make spring vehicle wheels have usually consisted in connecting an outer tire or rim with an inner circular member by means of coiled springs capable of expanding longitudinally or by connecting the hub with a felly or tire by long springs or combination spring elements. Both of these methods are faulty as they do not provide any material and effective lateral support.

This invention is designed to secure the same resiliency as would be obtained by the above described species of invention, and at the same time to provide a firm and effective lateral support, the same being furnished by the springs themselves and without the aid of additional and expensive guiding devices.

Referring to the drawings it will be seen that the invention is shown in Fig. 1 as applied to a complete wheel having a hub 10, spokes 11, and rim or felly 12. This may be taken as a wheel of any desired kind or character. On the felly is secured the attachment which is the subject of this invention, preferably by shrinking on the felly an inner rim 13 which constitutes a part of this attachment. The inner rim is provided with a pair of side flanges 14 which form a trough between them. They are oppositely perforated and through the openings pass a series of bolts 15. These bolts extend across the inner rim 13 and through transverse blocks 16. Each of these blocks is shown as provided with a plurality of projections 17 fitting into perforations 18 in the flat end of a wide spring 20. In its preferred form this spring is of a general S-shape in cross section, but it is substantially as wide as the rim or tire itself, and fits snugly between the flanges 14. Being held by the pins 17 and bolts 15 between these flanges 14 it will be seen that the straight part 21 of the spring is firmly gripped in this position, and cannot twist or turn under any ordinary circumstances. The spring has one of these plates at each end and all the parts mentioned are duplicated at the outer end of each spring, these springs being secured at the outer end between a pair of flanges 25 which are integral with the outer rim 26. These flanges are rounded over at 27 beyond the bolt-heads and nuts, and the rim is provided with a seat 28 for a solid rubber tire 29 or the like.

Although I have so far described only the S-shaped springs it will be obvious that the invention is not confined to springs of S-shape in cross section, but it relates more particularly to springs formed of flat metal secured at opposite ends to the inner rim and outer tire and secured firmly at opposite ends between circumferential flanges so as to be prevented from any lateral motion. Another form of spring which can accomplish these purposes, although perhaps not to the same degree is shown in Fig. 1 alternating with the S-shaped springs 20. These springs 30 are formed of flat pieces of metal extending entirely across the rim and tire, but are shown as made up of three pieces.

Two pieces 31 are secured to the inner rim 13 in the same way as the inner ends of the springs 20. They converge toward each other until they come into contact at a distance from the inner rim and there they are secured together by rivets or the like. At the same time the third piece 32 is secured to them at both ends and it is shown as having a general heart-shape, the apex being secured to the inside of the outer tire by a block 16 in the same way as in the other case. In this form the spring is more complicated and expensive, but at the same time it is somewhat better protected against lateral motion on account of the fact that the two parts 31 project in opposite directions from the line of rivets, and consequently there is a greater moment resisting any tendency to get the spring out of alinement with the flanges. It will be understood that both ends of this spring are held between the flanges and in close contact therewith to assist in preventing lateral motion.

While I have illustrated and described two forms in which the invention can be carried out, I am aware that many other modifications can be made therein by any person skilled in the art without departing from the scope of the invention as expressed in the claims. Therefore I do not wish to be limited to all the details of construction herein shown and described, but What I do claim is:—

1. In a device of the character described, the combination with an inner rim and outer tire having opposite flanges at their edges at the same distance apart, said flanges of the rim extending toward the flanges of the tire, a series of flat transverse blocks contained between each pair of flanges and spaced from the rim and tire respectively, a series of transverse bolts each extending longitudinally through one of said blocks and projecting through the flanges at their opposite ends, and a series of springs held at their opposite ends to the rim and tire respectively under said blocks.

2. In a device of the character described, the combination with an inner rim and outer tire having opposite flanges at their edges at the same distance apart, said flanges of the rim extending toward the flanges of the tire, a series of transverse flat blocks contained between each pair of flanges extending entirely across from one flange to the other, abutting against them at their ends, and secured rigidly thereto and spaced from the rim and tire respectively, and a series of springs rigidly secured at their opposite ends to the rim and tire respectively under said blocks.

3. In a device of the character described, the combination with an inner rim and outer tire having opposite flanges at their edges at the same distance apart, said flanges of the rim extending toward the flanges of the tire, a series of blocks contained between each pair of flanges and secured thereto and spaced from the rim and tire respectively, and a series of springs held at their opposite ends to the rim and tire respectively by said blocks, said springs having perforations therethrough and said blocks having projections entering said perforations.

4. In a device of the character described, the combination with an inner rim and outer tire having opposite flanges at their edges, of a series of blocks contained between each pair of flanges and secured thereto and spaced from the rim and tire respectively, and a series of springs held at their opposite ends to the rim and tire respectively by said blocks, said springs each consisting of three pieces, two flat members secured to the inner rim at a distance apart and converging toward each other, and a third heart-shaped member secured to both of said members where they come into contact and secured at its apex to the outer tire.

In testimony whereof I have hereunto set my hand, in the presence of two subscribing witnesses.

ISRAEL J. CARPENTER.

Witnesses:
C. FORREST WESSON,
E. M. ALLEN.

Copies of this patent may be obtained for five cents each, by addressing the "Commissioner of Patents. Washington, D. C."